Figure 1B:
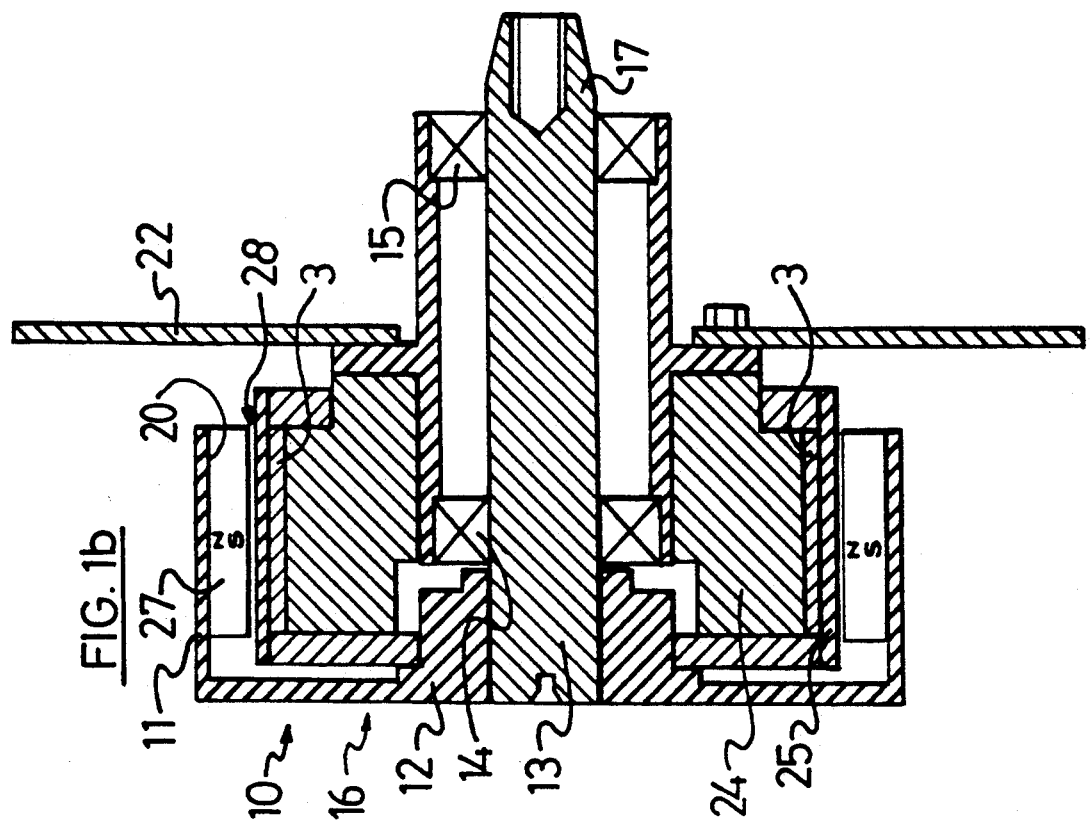

United States Patent [19]

Clark

[11] Patent Number: 5,289,066
[45] Date of Patent: Feb. 22, 1994

[54] STATOR FOR DYNAMOELECTRIC MACHINE

[75] Inventor: Peter B. Clark, Sandspit, New Zealand

[73] Assignee: Cadac Holdings Limited, Auckland, New Zealand

[21] Appl. No.: 646,379

[22] Filed: Jan. 28, 1991

[30] Foreign Application Priority Data

Feb. 1, 1990 [NZ] New Zealand ............. 232333

[51] Int. Cl.⁵ ............. H02K 7/00; H02K 21/12
[52] U.S. Cl. ............. 310/67 R; 310/156; 310/179
[58] Field of Search ............. 310/156, 67 R, 179, 310/DIG. 6, 180, 184, 254, 206

[56] References Cited

U.S. PATENT DOCUMENTS

| | | |
|---|---|---|
| 3,979,615 | 9/1976 | Neff ............. 310/71 |
| 4,217,508 | 8/1980 | Uzuka ............. 310/156 |
| 4,259,603 | 3/1981 | Uchiyama ............. 310/67 R |
| 4,275,319 | 6/1981 | Davis, Jr. ............. 310/43 |
| 4,303,843 | 12/1981 | Arnoux ............. 310/67 R |
| 4,340,829 | 7/1982 | McCoy ............. 310/71 |
| 4,600,864 | 7/1986 | Sato ............. 310/254 |
| 4,689,023 | 8/1987 | Strong, III ............. 310/DIG. 6 |
| 4,795,924 | 1/1989 | Kamiyama ............. 310/67 R |
| 4,837,921 | 6/1989 | Tassinario ............. 29/596 |
| 4,924,125 | 5/1990 | Clark ............. 310/67 R |
| 4,962,329 | 10/1990 | Fujita ............. 310/254 |
| 5,004,944 | 4/1991 | Fisher ............. 310/156 |
| 5,081,388 | 1/1992 | Chen ............. 310/156 |

FOREIGN PATENT DOCUMENTS

| | | | |
|---|---|---|---|
| 0236690 | 9/1987 | European Pat. Off. | H02K 15/02 |
| 0313514 | 4/1989 | European Pat. Off. | H02K 1/12 |
| 0029246 | 3/1980 | Japan . | |
| 58-212360 | 10/1983 | Japan | H02K 29/00 |

OTHER PUBLICATIONS

Magnetism & Magnetic Materials; by J. P. Jacubovics; The Institute of Metals; (no month) 1987; ISBN 0-9043-57-95-3.

Primary Examiner—R. Skudy
Attorney, Agent, or Firm—Young & Thompson

[57] ABSTRACT

A co-axial cylindrical brushless DC motor has an internal cylindrical stator and an external rotor containing permanent magnets. The cylindrical stator has a substrate of reinforced plastics covered by several layers of helically wound annealed steel wire of about 1 mm diameter to provide a cylindrical magnetic layer of soft magnetic material just below the wound poles on or adjacent the outer surface of the stator.

12 Claims, 9 Drawing Sheets

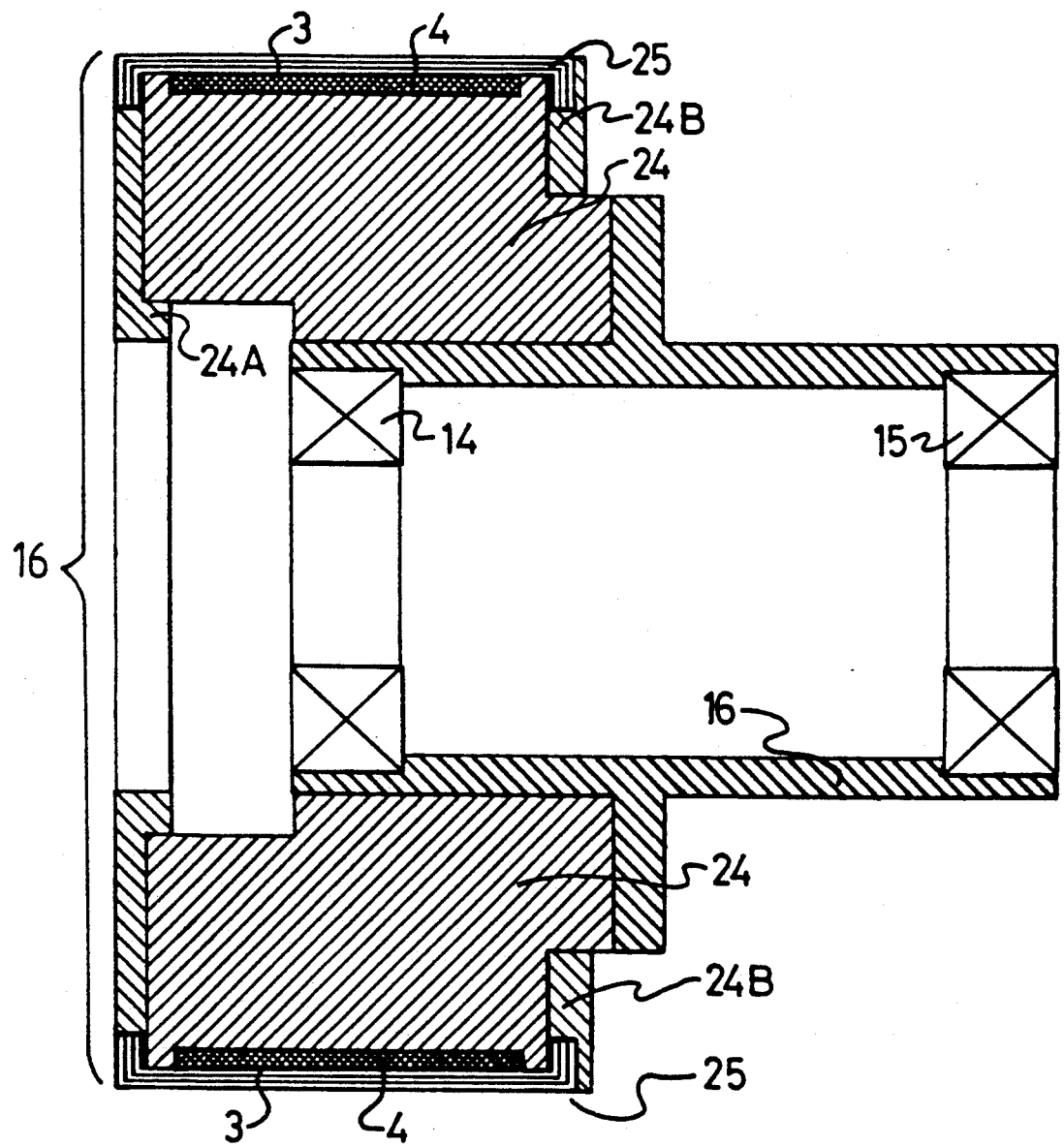

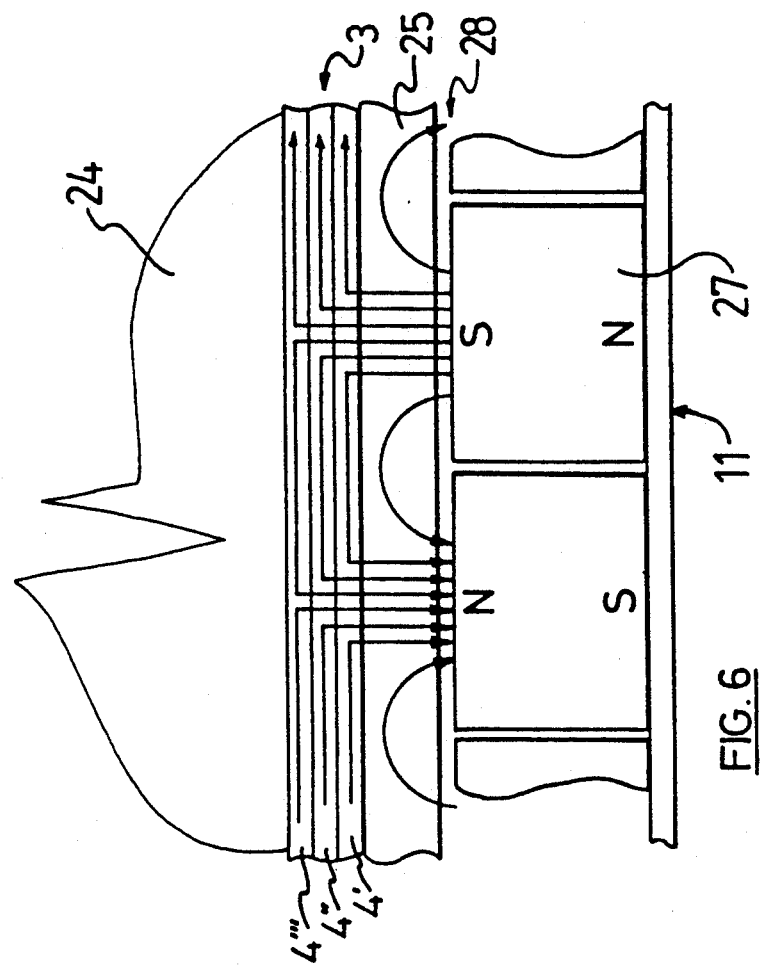
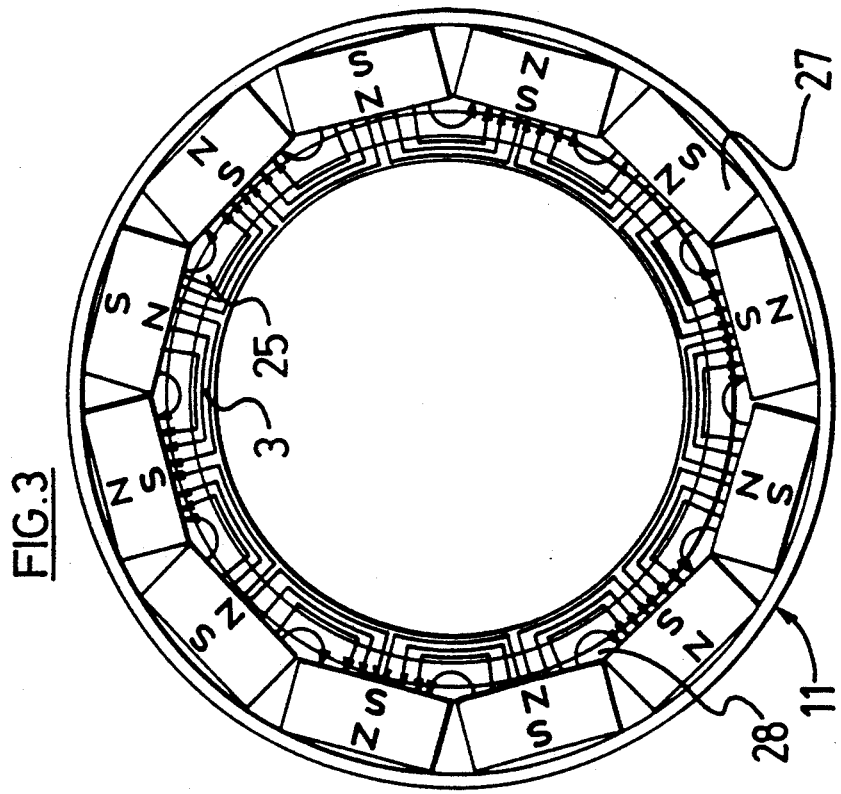
FIG.6
FIG.3

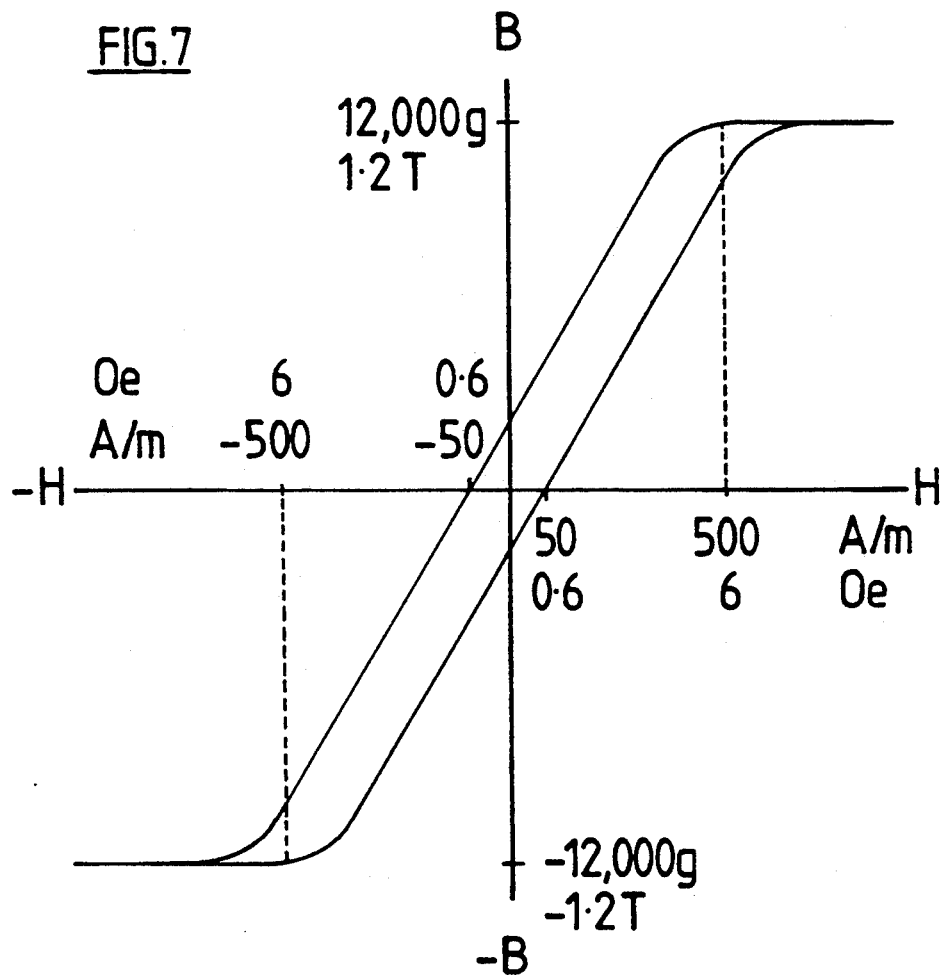

STATOR FOR DYNAMOELECTRIC MACHINE

FIELD

This invention relates to dynamoelectric machines, and has particular application to brushless DC electric motors.

BACKGROUND

Conventional electric motors have an internal rotor and an external stator. Typically both the rotor and stator having a large number of iron or steel laminations in order to increase the magnetic flux path from the magnetic poles on the rotor, whether these magnetic poles be wound electromagnetic poles or the magnetic poles of permanent magnets.

Attempts have been made to produce "ironless" motors, and we have developed such a motor described in our U.S. Pat. No. 4,924,125 (or described in PCT/GB 8800742).

There is a need to increase the power output of such "ironless" motors, but without incurring the disadvantages of iron or steel laminations, i.e. increased weight, current losses, and more importantly the resultant high inductance of such conventional steel lamination motors.

STATEMENT OF INVENTION

It is an object of this invention to go some way towards meeting the above mentioned need, and to provide an improved stator for dynamoelectric machines, and/or an electric motor which at least provides the public with a useful choice.

In one aspect, the invention provides an internal generally cylindrical stator, for a dynamoelectric machine having an external generally cylindrical rotor, said generally cylindrical stator comprising: wound poles and a generally cylindrical substrate; at least one annular cylindrical layer of elongate material provided at least close to the generally cylindrical surface of the substrate; with said wound poles superimposed on said at least one annular layer of elongate material; said elongate material comprising a soft magnetic material having a magnetic permeability greater than 20.

Preferably the one or more layers of elongate material exhibits low hysteresis and low eddy current losses.

Preferably the stator has a substrate of substantially nonconducting, substantially nonmagnetic material, and said one or more layers of elongate material of high magnetic permeability are positioned on or close to the surface of the substrate. Alternatively the stator substrate could be formed from a steel pressing or other metallic material.

Preferably the elongate material is in the form of a wire or tape of small cross section relative to its length so that each layer is made of a large number of turns of said wire or tape. The ferromagnetic wire or tape is generally referred to herein as "wire". It is preferably formed from a "soft magnetic" material such as an annealed steel wire wound on said substrate. Any "soft magnetic" material may be used, but we have found that annealed low carbon steel wire is inexpensive and is readily available. A "soft magnetic" material is one that can be easily magnetised. The term "soft" refers to the magnetic property of the material and not its mechanical property. The preferred "soft magnetic" materials have a large saturation magnetisation and a narrow hysteresis loop.

The invention is particularly suited to brushless DC motors, although it can be used with any dynamoelectric machines of any configuration including cylindrical motors and alternators, pancake motors and alternators, commutator motors, and linear motors. In the case of our preferred embodiment of the invention of a brushless DC motor the stator may be an internal or external cylindrical stator, although for larger machines we prefer to use an internal stator and an external rotor.

In another aspect, the invention provides a stator for a cylindrical dynamoelectric machine wherein said stator includes a generally cylindrical support having one or more layers of wire formed from a soft magnetic material on said support, and wound poles superimposed on said layer(s) of wire.

In another aspect, the invention provides a dynamoelectric machine having a generally cylindrical stator comprising a generally cylindrical substrate of substantially nonconducting, substantially nonmagnetic material, having one or more layers of wire formed from a soft magnetic material on said substrate, with wound poles superimposed on said layer(s) of wire; wherein said stator is an internal stator having said one or more layers of wire on the outer surface of the substrate with wound poles on the outer surface of the wire layer(s) and surrounded by an external substantially cylindrical rotor having a plurality of permanent magnetic poles on the inner cylindrical surface of said rotor.

In another aspect, the invention provides a brushless DC electric motor comprising a generally cylindrical rotor having a plurality of permanent magnetic poles associated therewith; and a stator having a generally cylindrical substrate having one or more layers of wire formed from a soft magnetic material on said substrate, and wound poles superimposed on said layer of wire and facing towards said rotor.

The invention may be utilised with machines having a low number of poles, e.g. 2 or 4 pole machines, however the invention is most advantageous where medium or high pole numbers are used and more preferably where the permanent magnetic poles are closely spaced around the periphery of the rotor. For machines of 6 to 30 poles for example, the layer(s) of soft magnetic wire can be relatively thin (in the range of 1 to 4 mm) and thus less steel (wire) is used than for a 2 pole machine. The exact number of poles will depend on the rotor size but for most applications we prefer to manufacture machines with 6 to 20 poles.

Preferably the magnetic layer or layers of wire formed on the stator consists of wire (such as steel wire) wound in one or more helical layers. Alternatively, the layer or layers may be formed of discrete loops of wire placed on the cylindrical stator. Preferably, the wire is of circular cross section and has limited surface contact with adjoining wires, so that the conductivity of the or each layer along the axial dimension of the stator is reduced; although other regular or irregular prismatic shapes may be used. For a medium speed machine having a stator diameter of about 110 mm, a magnetic depth of about 4 to 5 mm deep may be made from 2 to 4 layers of wire of from about 0.5 mm diameter to about 2 mm diameter.

Preferably the surface of the wire is of low conductivity (and an annealed steel wire has relatively low surface conductivity) or the wire may be coated with an insulating layer such as varnish, or a thin insulating sheath (such as a synthetic plastics material).

It will be generally convenient to keep any insulating sheath or covering as thin as possible, in order to maximise the magnetic content of the wire layer or layers.

Such a machine having a stator formed from one or more layers of a soft magnetic material in the form of wires or tapes wound on or laid on the surface of the substrate enables a machine to be made at low cost, and have low inductance. Such a machine can be used with relatively low cost electronic commutation systems, so that a brushless DC motor can be produced having simple electronic controls.

DRAWINGS

Figure 1A:
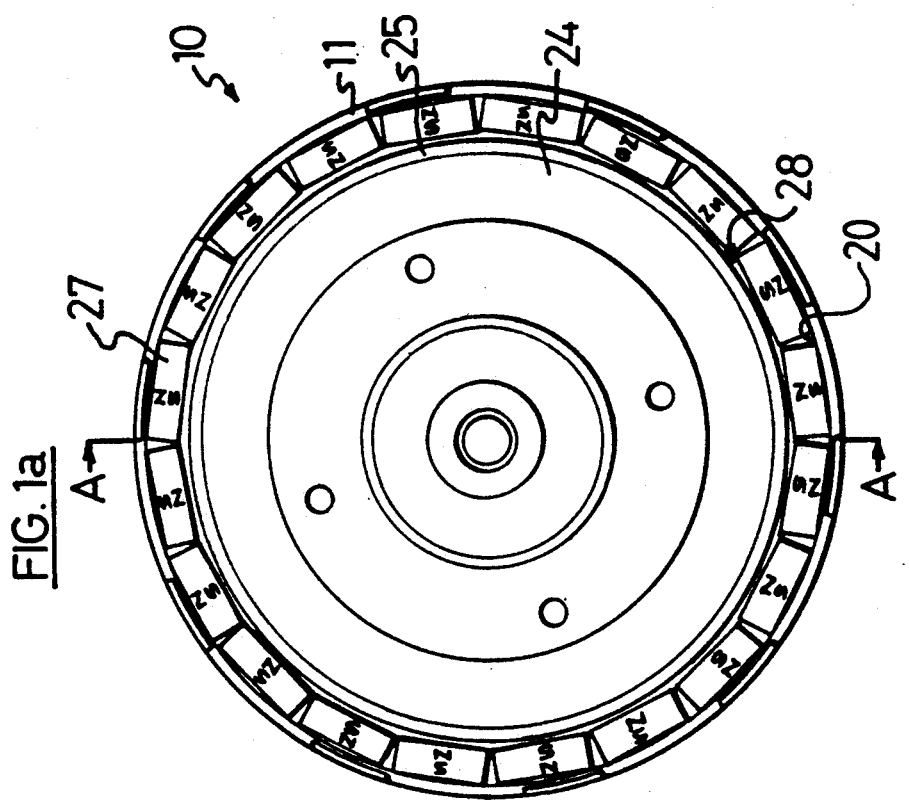

These and other aspects of this invention, which should be considered in all its novel aspects, will become apparent from the following description which is given by way of example only, with reference to the accompanying drawings in which:

FIG. 1a: is a drive end view (with mounting plate removed) of a permanent magnet rotary dynamo electric machine showing the external rotor construction using bar magnets.

FIG. 1b: is a section on line AA of FIG. 1, (with mounting plate in position), showing the placement of the bar magnets in the outer rotor, and the relative position of the stator within the rotor.

Figure 1C:
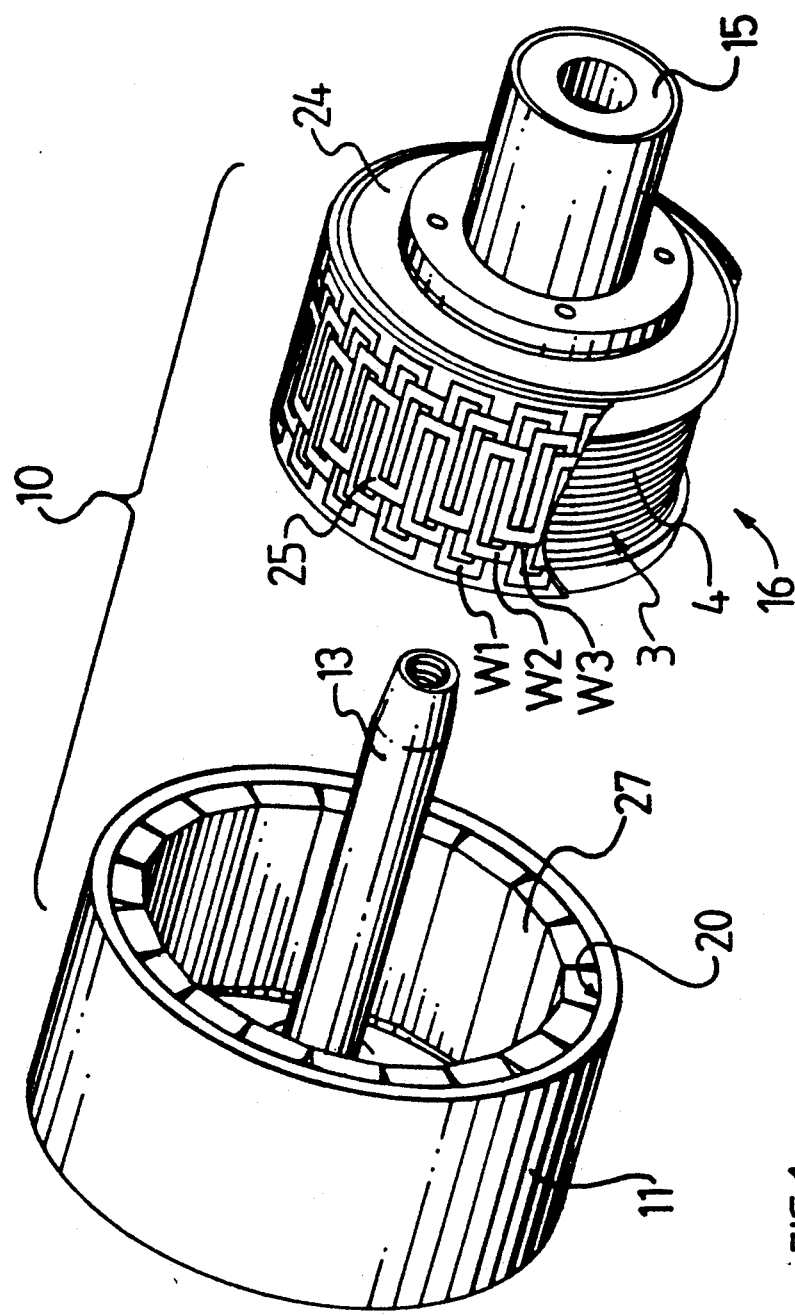

FIG. 1c: is an exploded perspective view of the rotor and stator of FIGS. 1a and 1b showing the layers of steel wire beneath the wound poles.

FIG. 1d: is an expanded sectional view of the stator of FIG. 1b, with the depth of the three layers of steel wire and the depth of the wound poles exaggerated for the purpose of identification.

Figure 2B:
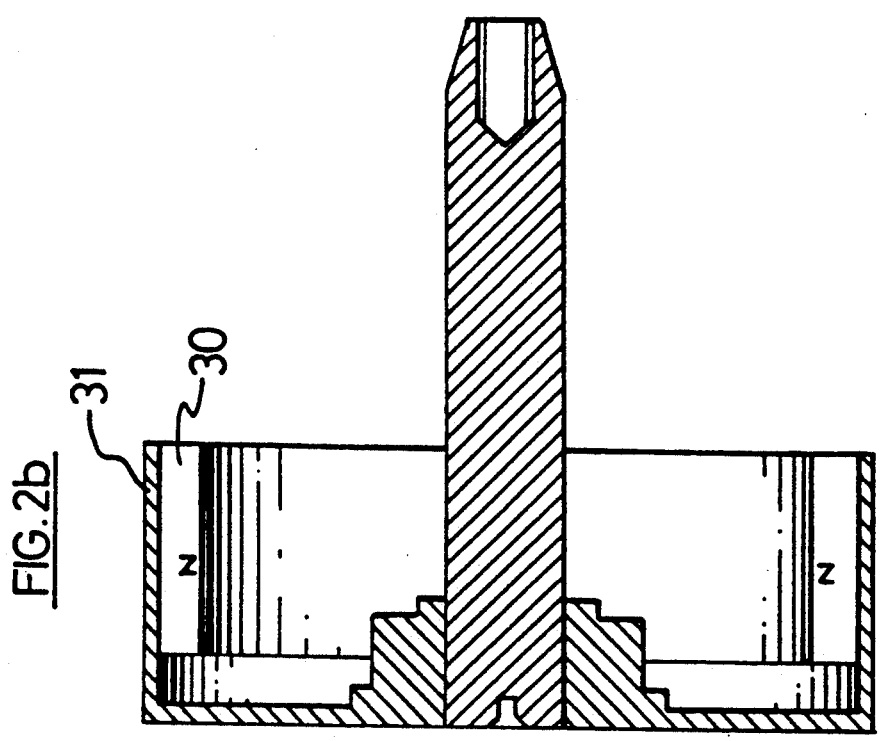
Figure 2A:
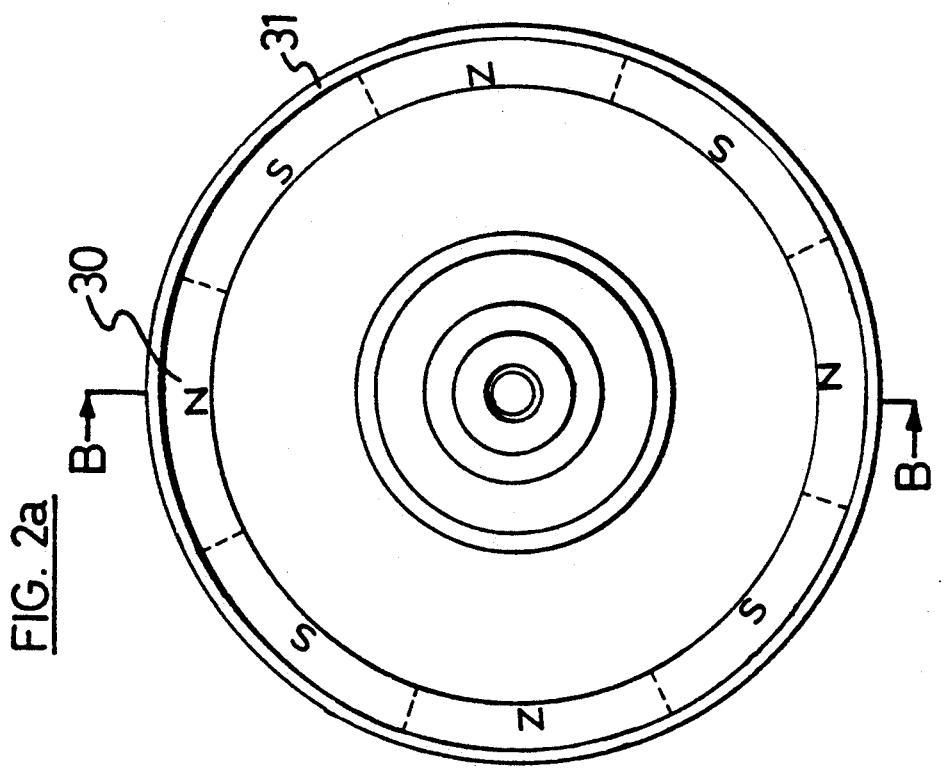

FIG. 2a: shows the drive end view of a permanent magnet rotary dynamo electric machine having an external rotor formed from a one piece ring magnet. (The stator construction has been omitted from this drawing.)

FIG. 2b: is a section on line BB of FIG. 2a, showing the construction of the rotor only.

FIG. 3: shows a flux diagram for a 12 pole permanent magnet rotary dynamo electric machine of this invention.

Figure 4:
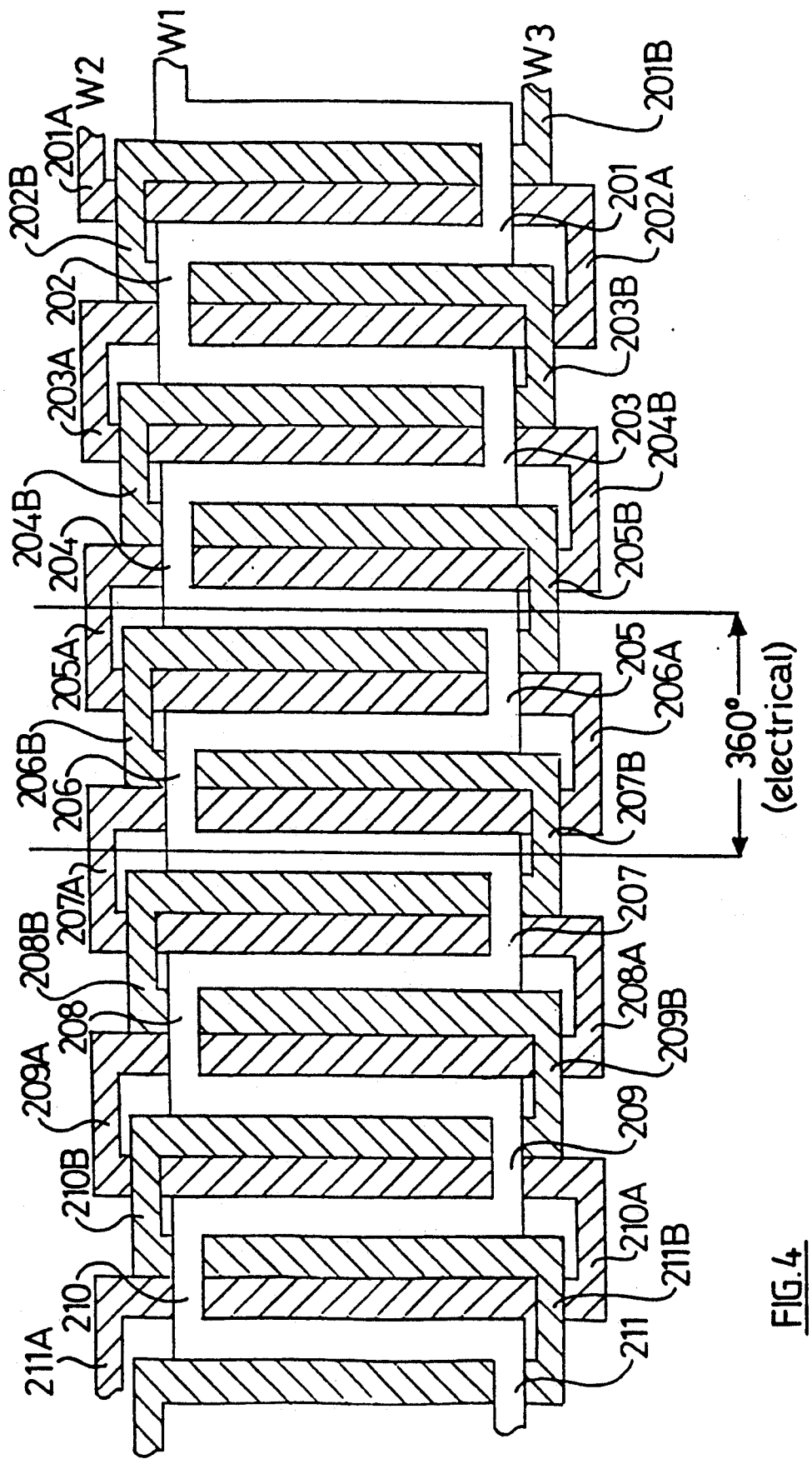

FIG. 4: shows a three phase winding construction for a typical permanent magnet rotary dynamo electric machine of this invention.

Figure 5B:
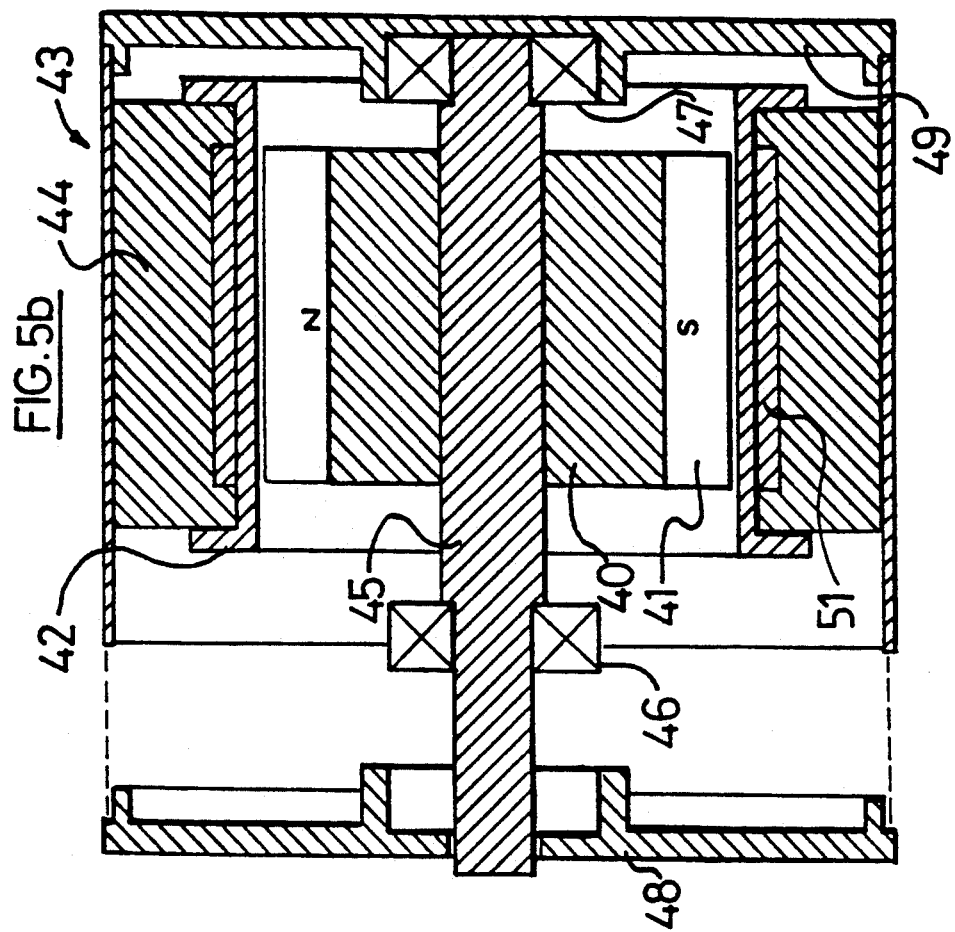
Figure 5A:
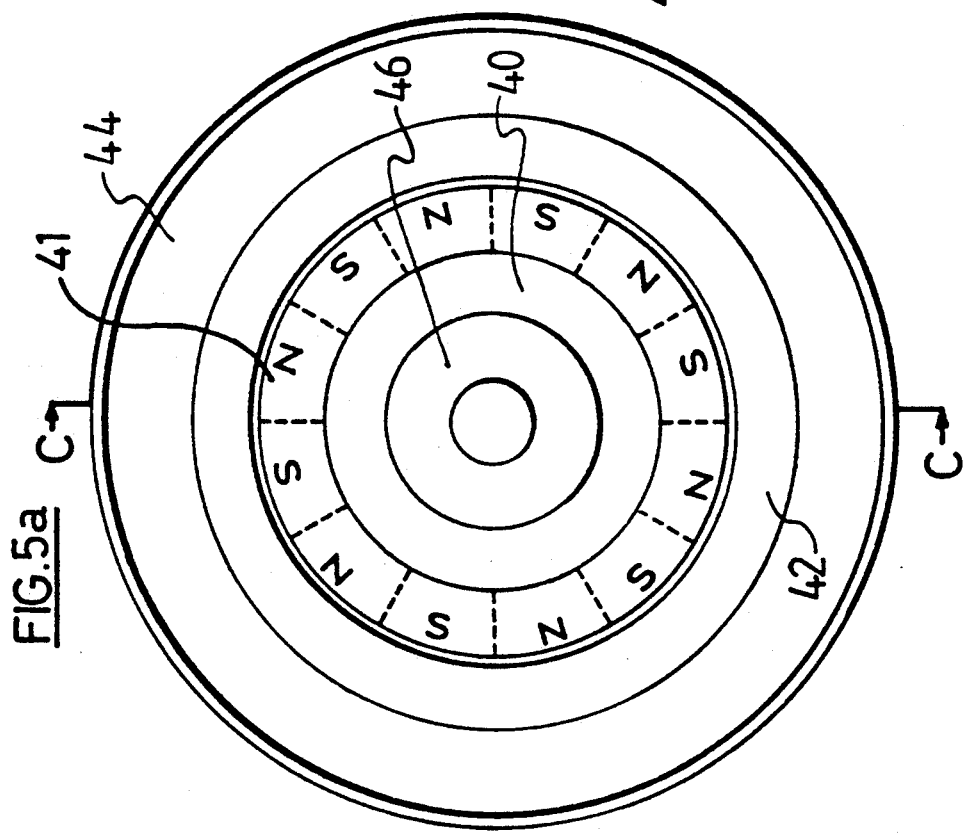

FIG. 5a: shows the drive end view (end cover removed) of a permanent magnet rotary dynamo electric machine showing an internal rotor construction using a cylindrical magnet.

FIG. 5b: shows a section on line CC of FIG. 5a, in exploded view, of the end cover, internal rotor, and external stator.

FIG. 6: shows an expanded view of the magnetic flux path through the steel wires.

FIG. 7: is a graph of the magnetic properties of the preferred annealed steel wire.

Figure 8B:
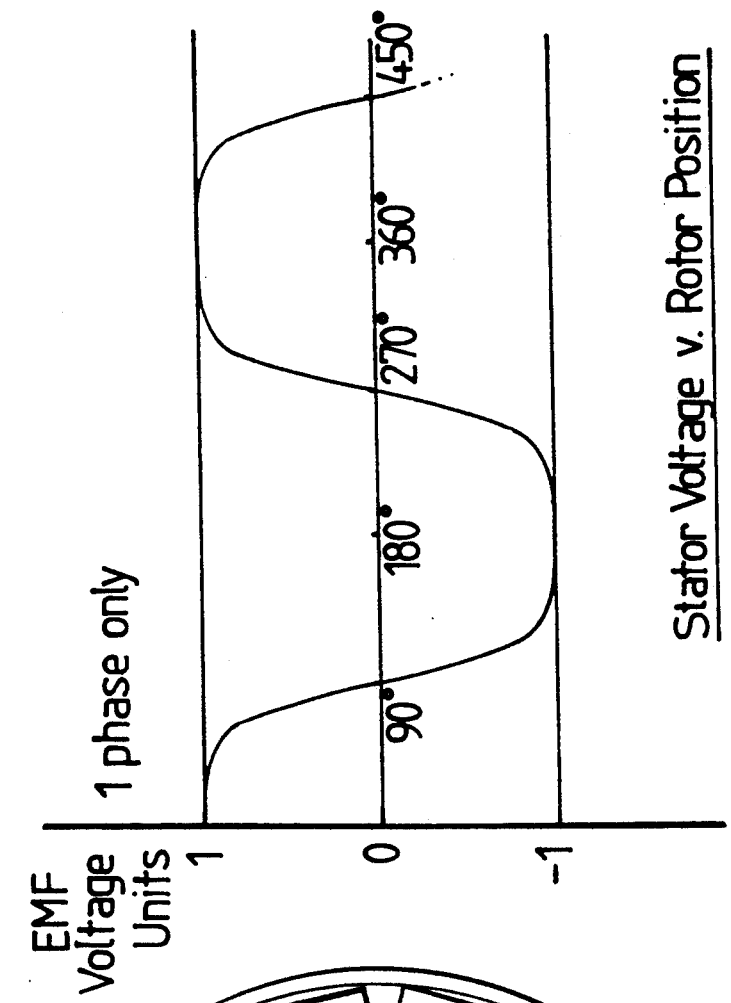
Figure 8A:
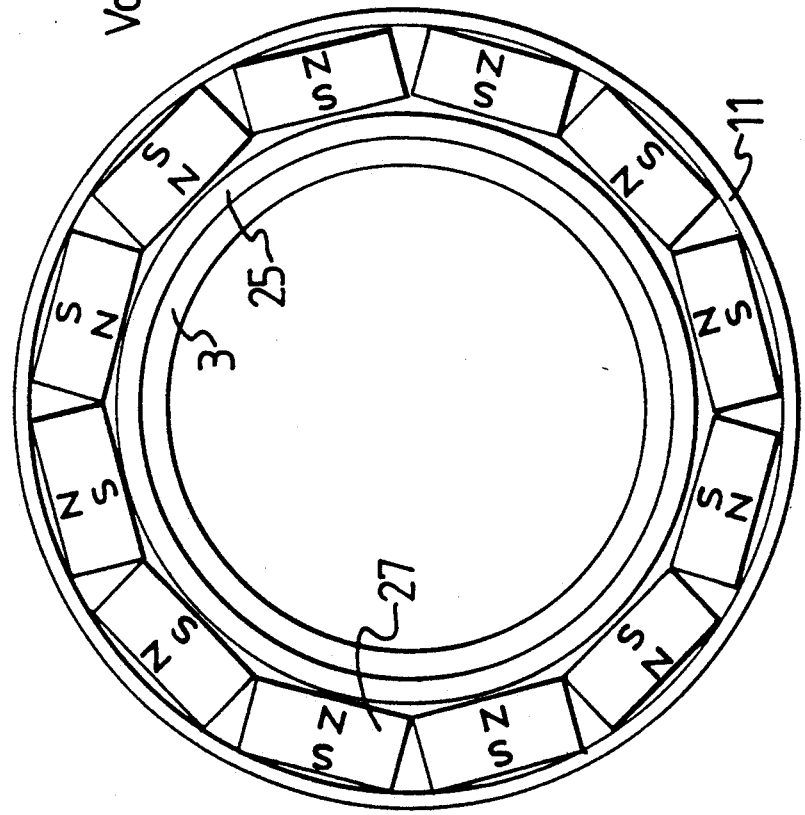

FIG. 8a: shows an end view of a stator and rotor for a 6 pole permanent magnet rotary dynamo electric machine using 12 bar magnets in pairs.

FIG. 8b: shows a voltage graph for a typical permanent magnet rotary dynamo electric machine of this invention.

The motor/alternator of this invention is preferably constructed using a series of adjacent bar magnets inside a steel annulus to form the rotor as shown in FIG. 1a. The steel annulus provides two important functions:

1. A mechanical support for the magnets against the high centrifugal forces encountered when the rotor is running at high rpm. It will be apparent that ceramic and rare earth magnets have a low tensile strength when compared to the steel cup shaped rotor of FIG. 1b.

2. A return path for the magnetic flux between adjacent magnets. The bar magnets could equally well be replaced by a cylindrical "ring" magnet, as shown in FIG. 2a, with alternate north and south poles around its circumference.

In the following examples, it is most convenient to provide the permanent magnets on the rotor so that electrical connections can be readily made to the wound poles on the stator.

Preferably the co-axial steel-wire stator direct current motor is controlled by electronic means to provide a brushless DC motor.

EXAMPLE 1—FIGS. 1a to 1d

In this example, a co-axial motor or alternator is illustrated, having an external rotor construction utilizing bar magnets. Whether the unit is used as a motor or an alternator will depend upon the application required, and whether or not current is extracted from the stator windings, or whether current is supplied to the stator windings to operate the unit as a motor.

Preferably the motor/alternator 10 has a cylindrical sleeve 11 which is conveniently in the form of a cup having an end face 12, which is attached to a central shaft 13. This shaft is preferably mounted within bearings 14, 15 mounted within a stator 16. Conveniently, the shaft has a tapped end 17 for connection to other machinery.

Preferably, the inner face 20 of the sleeve 11 is provided with a plurality of side by side bar magnets 27, aligned with their long axes parallel to the axis of the rotor and are magnetised radially (as shown in FIGS. 1a, 1b, 3 and 8a). Alternatively an annular magnetic material may be magnetised so as to form a number of poles, as shown in FIGS. 2a and 5a. It will be appreciated that there will be an even number of such closely spaced magnets, so that the polarity of the permanent magnetic poles alternates as one travels around the inner circumference presented by these magnets. [This differs from traditional motor designs where the magnetic poles are widely spaced and there are much longer flux paths through the steel laminations of the stator/core].

The magnets 27 are preferably rare earth or ceramic bar magnets, and 20 such magnets are shown in FIG. 1a, for the purpose of illustration. Any even number of such magnets can be used depending upon design criteria such as size, weight, price, availability and frequency. For medium speed machines 6 to 30 poles are preferred, with 6–20 permanent magnetic poles providing optimum performance for a motor of the type illustrated in FIGS. 1a and 1b. By closely spacing the magnets around the rotor circumference, the motor can be used with a minimal amount of steel wire on the stator and can also be used with relatively low cost electronic commutation.

Preferably the bar magnets are formed from either rare earth or ceramic magnets, and have a high field strength enabling them to provide a higher magnetic flux across a much wider air gap than is possible with conventional magnets, but at the same time it is preferred that the adjacent permanent magnetic poles are close together—in fact preferably in contact—to provide a short magnetic flux path between adjacent magnetic poles.

Preferably, the rotor sleeve and end face are formed of steel although other materials could be used.

It is preferred that the rotor and stator are spaced apart by a relatively large cylindrical air gap 28 of the order of 0.25 mm to 1.5 mm and preferably 0.75 mm for the 20 pole motor/alternator of this example. This enables the wound poles to intersect the magnetic flux path as shown in FIG. 3. The air gap is preferably less than the depth of the magnets and should be of such a size as to allow for normal engineering clearances and tolerances.

The stator has an annular generally cylindrical substrate 24 of low magnetic permeability material (i.e. less than 20 relative to air) covered with a plurality of layers of annealed steel wire of small cross section. Such wire may be say, 1 mm diameter and wound in a tight helix on the outer surface of the cylindrical stator. With such a small diameter wire a number of layers are wound one on top of the other, and in this example three such layers are used to give a depth of magnetic material of approximately 3 mm.

A plurality of wound poles 25 are provided on top of the outermost layer of steel wire. Typically the wound poles would have a thickness approximately equivalent to that of the steel wire layer(s).

The substrate of the stator is preferably formed from a synthetic plastics material such as "TUFNOL" or a glass reinforced plastics as this can be formed into a sufficiently rigid cylindrical surface. "TUFNOL" is the trade mark of a plastics product containing layers of cotton fabric impregnated with phenolic resin which can be machined to form the stator. The steel wire and would poles may also be covered with a similar resin so that neither the steel wire or wound poles could be said to be on the surface of the stator (although they would be close to the resulting resin surface). 24A and 24B refer to capped exterior surfaces on the stator. 22 (FIG. 1b) indicates a mounting plate for the motor.

Individual wires 4 are particularly shown in FIG. 1c and in the cross-sectional view of FIG. 1d. Three helical windings or layers of 1 mm diameter steel wires are represented by the numeral 3 making up the totality of the included soft magnetic material. (Three such wires (or tapes) 4', 4", 4''' are shown in FIG. 6 with the magnets and wires projected onto a flat plane). These layers of steel wire have an axial length substantially equivalent to that of the length of the rotor magnets but preferably less than the length of the wound poles 25, as shown in FIG. 1d. The steel wire is preferably wound within a slot machined in the surface of the cylindrical substrate 24.

The number of wound poles correspond to the number of permanent magnetic poles inside the rotor. The wound poles are relatively shallow in that they are formed on or close to the surface of the substrate (unlike conventional wound poles which are wound within slots formed in steel laminations). The depth of the wound poles on or close to the surface of the stator will depend upon the size of the stator and required rating of the motor. In the example shown, the depth would be of the order of 1 mm to 10 mm, and preferably about 3 mm.

It will be generally convenient to provide the wound poles as wave or lap windings on that surface of the stator facing the permanent magnetic poles. For example FIG. 4 shows the wave windings W1, W2, W3 each providing a plurality of wound poles 201-211, 201A-211A, and 201B-211B on the surface of a substrate for a three phase stator winding as used in the motor/alternator of FIGS. 1a/1b. As will be discussed below a three phase winding is preferred for most applications but other phases have their uses for particular applications. They may be exposed to the air or encapsulated in a plastic resin of low magnetic permeability.

The wound poles may be provided in a variety of forms and may provide for one or more phases. They are shown schematically in FIGS. 1b, 1c and 4 as wave windings on a flexible substrate. However, it is preferred that in most cases the windings are lap windings having turned-over ends as shown in FIGS. 1d and 5b. The wound poles on the surface of the stator are so positioned as to intersect the magnetic flux lines connecting adjacent ceramic magnets as the flux lines essentially form a series of loops from one magnet to the next as one travels around the inner circumference of the rotor. This is shown in FIG. 3 which illustrates the relative position of the wound poles 25 and the soft magnetic layer—the layers of steel wires 3, and the relatively short magnetic flux paths between adjacent permanent magnetic poles on the rotor.

EXAMPLE 2—FIGS. 2a and 2b

This arrangement is similar to that of example 1 except that a single cylindrical ring magnet 30 is provided on the inside of the cup shaped rotor 31. The stator (not shown) can be the same as that of FIG. 1d. This ring magnet has 8 poles. FIG. 2a is an end view of the rotor from the open end, and FIG. 2b is a section through B—B of FIG. 2a.

EXAMPLE 3—FIG. 3

This example motor has 12 closely spaced permanent magnetic poles around the periphery of an external cylindrical rotor. FIG. 3 shows the average magnetic flux path between a permanent magnet rotor and that part of a stator comprising the annular cylindrical layer 3 of steel wires showing that the flux is substantially confined (FIG. 6) to this thin annular cylindrical layer 3 formed from the steel wires.

EXAMPLE 4—FIGS. 5a and 5b

This arrangement has a single cylindrical ring magnet 41 on an internal rotor 40, i.e. the permanent magnetic poles are on the outer face of the rotor 40, and are surrounded by the wound poles 42 on the inner cylindrical face of the stator 43. The wound poles 42 contact a layer 51 of soft magnetic material wound from annealed steel tape, in a helical configuration. This helical layer 51 of steel tape is embedded in a low-magnetic permeability substrate 44 forming part of the stator. The rotor is mounted on a shaft 45 which is mounted in bearings 46, 47 in end plates 48, 49.

EXAMPLE 5—FIGS. 8a and 8b

FIG. 8a shows a 6 pole machine using 12 bar magnets 27 in pairs to create the effect of wider magnets. This is similar to FIG. 3 but without showing the flux paths. Again, 25 represents the wound poles, 11 represents the sleeve of the rotor which holds the magnets, and 3 represents the ferromagnetic layer of wire.

FIG. 8b shows the stator voltage for different rotor positions for one phase only of the three phase stator windings of the motor/alternator of FIGS. 1a to 1c. The degrees scale refers to electrical phase, not to mechanical rotation of the motor. The closely spaced magnetic poles create "flat-topped" waveforms, and this is a characteristic of all of the motors illustrated in the accompanying figures.

SOFT MAGNETIC WIRE—FIG. 7

FIG. 7 is a graph of magnetic coercivity H (in Ampere-turns meter $^{-1}$) against flux B in Teslas for a soft magnetic material such as annealed steel wire. The designation "A" refers to Ampere-turns, i.e. 1 Ampere in 1 turn coil. The equivalent American values in Gauss and Oersteds are also shown. [1 Tesla=10,000 Gauss, 1 A/m=0.01257 Oe]. Note that the area within the graph is small, i.e. the material exhibits low hysteresis.

Annealed steel wire of about 0.3% carbon content has been used in building prototypes of the invention as it is inexpensive and readily available. However other soft magnetic materials in wire or tape form may be used. Examples include iron; iron alloys such as iron-cobalt alloys, Permendur*, Supermendur*, iron-silicon alloys; nickel-iron alloys, Mumetal*, Supermumetal*, Supermalloy*, Invars*, Elinvars*, Amorphous Alloys; steel alloys; and ferrites. [An asterisk denotes a trade name mentioned on pages 95-104 of *Magnetism and Magnetic Materials* by J. P. Jakubovics, published by The Institute of Metals, 1987, ISBN 0-904357-95-3, which contains a useful discussion of "soft magnetic" materials]. The material should have a magnetic permeability of more than 20 (relative to air) and most probably will have a permeability in the range of 100-1000 (relative to air).

If an annealed steel wire is used the depth of soft magnetic material preferably would not exceed 4 to 5 mm for most medium speed motors. For example, a 16 pole motor with a stator diameter of 110 mm and operating at 1500 rpm (a frequency of 200 Hz), would have 3 layers of annealed steel wire of between 1 and 1.6 mm diameter giving a depth of magnetic material of approximately 3-5 mm. As iron losses are proportional to the square of the operating frequency, it is preferable that for medium speed motors the wire diameter is not greater than 1.6 mm, to keep eddy current losses down. For very large slow motors a larger wire diameter could be used. There should be a sufficient depth of wire to provide a good magnetic path between adjacent poles. A large slow motor (operating at say 50 Hz) could perhaps use 3 layers of annealed steel wire up to 6 mm in diameter.

20 POLE CYLINDRICAL MOTOR

Such a motor as shown in FIGS. 1a-1c may have a stator diameter of 150 mm with 3 helical layers of steel wire of 1 mm diameter providing a magnetic layer of 3 mm thickness and covered with a wound pole layer of 3 mm thickness.

2 POLE MOTOR

By way of contrast a similar diameter 2 pole motor requires a much thicker magnetic layer, of approximately 20 mm thick, typically 10 layers of 2 mm diameter steel wire. Such a motor will suffer from much greater steel losses than the 20 pole machine unless it is operated only at slow speeds.

HIGHER POLE NUMBER MACHINES

By constructing machine with 6 or more poles it is possible to use a thin layer of small diameter steel wire and allow the machines to operate at high speeds with relatively low inductance and low steel losses. At higher pole numbers the frequency of the electrical noise generated by commutation will be above the resonant frequencies of the mechanical enclosure of the machine. Higher pole number machines (typically in the range of 6-30 poles) preferably have the permanent magnetic poles closely spaced around the periphery of the rotor as this provides the best wave forms for use with fully electronic commutation circuits. However, if Hall effect sensors or optical sensors are used to detect the rotor position it may be advantageous to use widely spaced poles with the steel wire configuration of this invention.

It will be noted that the tight helical winding of the steel wire layers on the cylindrical substrate allows each wire to approximate a circumferential loop. Instead of a helical winding each layer could be formed from a plurality of loops on the substrate.

DIFFERENT PHASES

In the above examples a three phase motor/alternator is described but other phase windings may be used, and in particular 1, 2 and 4 phase configurations will now be described.

SINGLE PHASE CO-AXIAL MOTORS/ALTERNATORS

1. Single phase co-axial alternators are the most simple configuration of stator for this machine and can find uses where simplicity of construction outweighs absolute output power. The three phase equivalent produces twice the output power for the same resistive losses, and 50 per cent additional copper in the stator windings.

2. Single phase co-axial motors are the most simple configuration of stator for this machine, but required some means of starting (similar to single phase induction motors) and therefore require an additional winding or mechanical means to ensure starting. In areas of low starting torque requirements i.e. direct coupled fans there could be a use for single phase motors.

TWO PHASE CO-AXIAL MOTORS/ALTERNATORS

1. Two Phase Co-axial Alternators. The machine provides a 40% increase in output power for the same resistive losses of a single phase machine.

2. Two Phase Co-Axial Motors. Due to two phase operation there are no starting problems, but if the machine is to be electronically controlled from a direct current supply then efficiency could be low if 180 degree current injection is used. The two phase motor could be electronically controlled to provide the 180 degree current injection just for starting and reduce to 120 degrees or less for normal running operation.

THREE PHASE CO-AXIAL MOTORS/ALTERNATORS

1. Three Phase Co-axial Alternators. This machine provides an increase in output power for the same resistive losses as a single or double phase machine. If the three phase machine uses the same amount of copper as a two phase machine and the stator windings of both machines occupy the full 360° available, then the three phase machine can produce a further 7% output power over the two phase machine for the same resistive losses (i.e. 47% increase over the single phase machine).

2. Three Phase Co-Axial Motors. Due to three phase operation there are no starting problems, and the machine can easily be electronically controlled from a direct current supply. Due to the 120 degree split with three phase operation sufficient back EMF voltage exists over the 120 degrees to provide efficient current injection from a direct current supply, and this design allows for accurate control of the rotor position, e.g. for a stepper motor.

GREATER THAN THREE PHASE CO-AXIAL MOTORS/ALTERNATORS

1. Co-axial Motors. Slightly higher efficiency possible due to possible smaller current injection angle. The four phase motor has possible applications, due to simplicity of electronically controlled reversing of rotor direction.

2. Co-axial Alternators. No additional benefits other than a slightly higher efficiency and lower ripple voltage if the output of the alternator is being rectified to provide a direct current power supply.

VARIATIONS

In all of these examples the wound poles are formed on one or the other of the rotor or the stator and the permanent magnetic poles are provided on the remaining one of the stator or the rotor. However it is possible to provide other configurations, e.g. the steel wire may be provided on the stator of a linear motor or on the stator or rotor of a pancake motor. The rotor may be provided with a band of permanent magnetic poles then a band of wound poles and associated steel wire layer(s) (which may be repeated along its length) and the stator would then be provided with the opposite configuration so that a band of wound poles and layer(s) of steel wire on the stator face the band of permanent magnetic poles on the rotor, and a band of permanent magnetic poles on the stator face the band of wound poles and layer(s) of steel wire on the rotor.

Finally it will be appreciated that various other alterations or modifications may be made to the foregoing without departing from the scope of this invention as set forth in the following claims.

I claim:

1. A rotary dynamoelectric machine comprising:
a generally cylindrical stator having a stator surface surrounded by a generally cylindrical external rotor rotatable about a rotational axis and having a generally cylindrical rotor surface facing said stator surface and being spaced apart therefrom by a generally cylindrical gap;
a plurality of magnetic poles on said rotor surface facing said stator surface and positioned adjacent said generally cylindrical gap;
wherein said stator has a generally cylindrical substrate of a first material having an outer surface and a thin annular cylindrical layer on said outer surface of said substrate, said annular cylindrical layer having an outer annular surface, a plurality of wound poles superimposed on said outer annular surface, so that the wound poles are adjacent said cylindrical gap and face said rotor, and at least a majority of the wound poles are positioned substantially parallel to the rotational axis of the rotor; and
wherein said thin annular cylindrical layer is formed from one or more layers of an elongate material, said elongate material comprising a soft magnetic material having a magnetic permeability greater than 20.

2. A rotary dynamoelectric machine as recited in claim 1 wherein:
said first material of said substrate is a substantially nonconducting, substantially nonmagnetic material.

3. A rotary dynamoelectric machine as recited in claim 1 wherein:
said elongate material comprises a wire of small cross-section relative to its length, and the annular cylindrical layer is made up of a large number of turns of said wire.

4. A rotary dynamoelectric machine as recited in claim 1 wherein:
said magnetic poles of the rotor are permanent and are closely spaced around the generally cylindrical rotor surface.

5. A rotary dynamoelectric machine as recited in claim 4 wherein there are between 6 and 20 permanent magnetic poles.

6. A rotary dynamoelectric machine as recited in claim 5 wherein said elongate material includes an annealed steel wire wound on said substrate.

7. A rotary dynamoelectric machine as recited in claim 6 wherein:
said wire is wound on said substrate in at least one substantially helical layer to form said thin annular cylindrical layer.

8. A rotary dynamoelectric machine as recited in claim 7 wherein:
said wire has a substantially circular cross-section and also has a diameter of between about 0.5 mm. and about 2.0 mm.

9. A rotary dynamoelectric machine as recited in claim 3 wherein:
said magnetic poles of the rotor are permanent and are closely spaced around the generally cylindrical rotor surface.

10. A rotary dynamoelectric machine as recited in claim 9 wherein there are between 6 and 20 permanent magnetic poles.

11. A rotary dynamoelectric machine as recited in claim 10 wherein said elongate material includes an annealed steel tape wound on said substrate.

12. A rotary dynamoelectric machine as recited in claim 11 wherein said tape is spirally wound on said substrate to form said thin annular cylindrical layer.

* * * * *